June 13, 1944.  W. A. BRECHT  2,351,479
TURBINE-DRIVEN LOCOMOTIVE APPARATUS
Filed Nov. 20, 1942  3 Sheets-Sheet 1

INVENTOR
WINSTON A. BRECHT.
BY
ATTORNEY

June 13, 1944. W. A. BRECHT 2,351,479
TURBINE-DRIVEN LOCOMOTIVE APPARATUS
Filed Nov. 20, 1942 3 Sheets-Sheet 2

INVENTOR
WINSTON A. BRECHT.
BY
ATTORNEY

June 13, 1944.  W. A. BRECHT  2,351,479
TURBINE-DRIVEN LOCOMOTIVE APPARATUS
Filed Nov. 20, 1942  3 Sheets-Sheet 3

INVENTOR
WINSTON A. BRECHT.
BY
ATTORNEY

Patented June 13, 1944

2,351,479

UNITED STATES PATENT OFFICE 2,351,479

TURBINE-DRIVEN LOCOMOTIVE APPARATUS

Winston A. Brecht, Wilkinsburg, Pa., assignor to Westinghouse Electric & Manufacturing Company, East Pittsburgh, Pa., a corporation of Pennsylvania Application November 20, 1942, Serial No. 466,293

3 Claims. (Cl. 105—113)

The invention relates to toothed gearing for transmitting power from a motor device, such as an elastic-fluid turbine, to the driving axles and wheels of a locomotive, and it has for its object to provide an arrangement to divide the gear load so as to limit the tooth stresses with the result that it becomes possible, for a given gear width, to transmit larger power, this being a matter of importance in connection with locomotives and the like or wherever the application imposes dimensional limitations.

This and other objects are effected by the invention as will be apparent from the following description and claims taken in connection with the accompanying drawings, forming a part of this application, in which:

Figure 2:
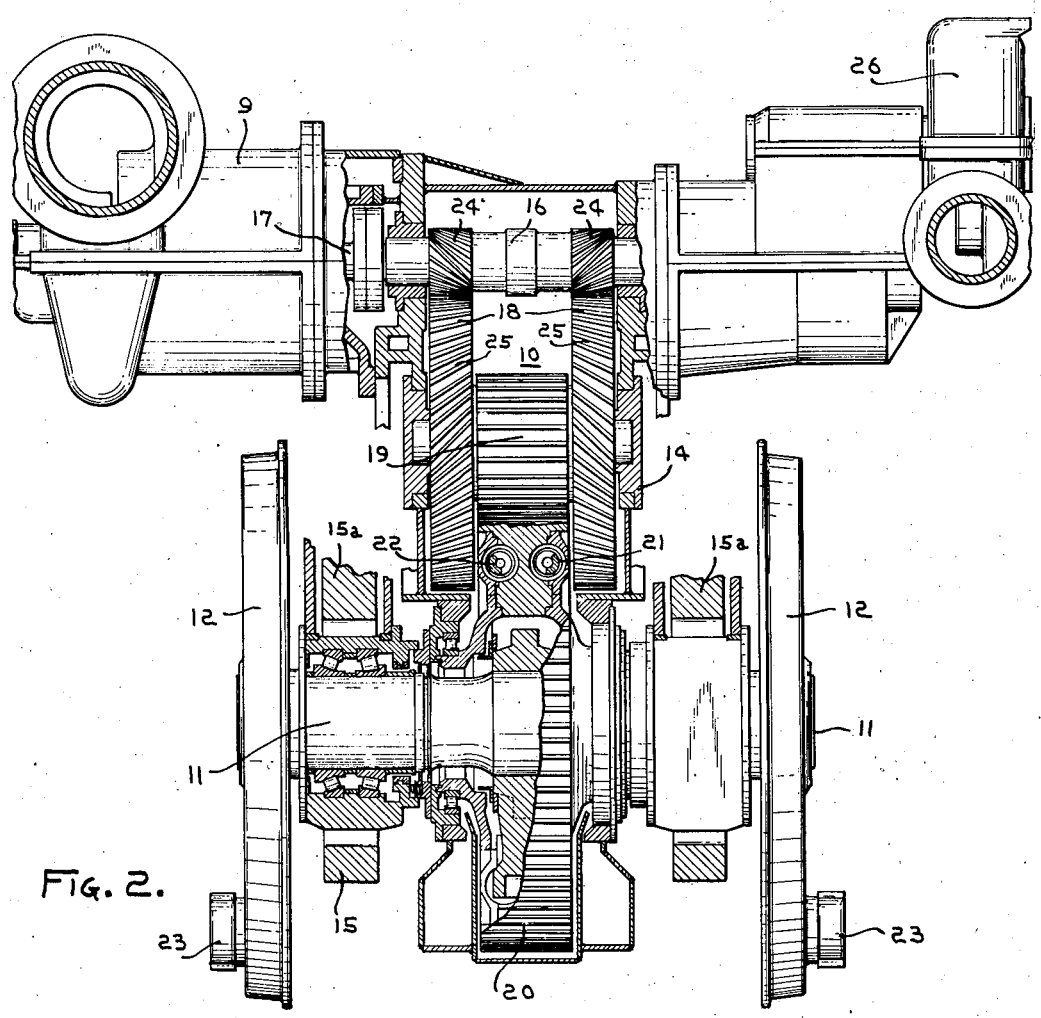
Fig. 2 is a fragmentary transverse view, partly in section and partly in elevation, of apparatus shown in Fig. 1.

Referring now to the drawings more in detail, there is shown a locomotive 8 provided with a motor device, for example, an elastic-fluid turbine 9 connected by gearing, at 10, to adjacent axles 11 for the driving wheels 12 engaging rails 13. The gearing is carried by a casing 14 mounted on the locomotive frame 15. The gear casing has at least its lower portion extending between the frame side members 15a (Figs. 2 and 3) so as to position the gearing in relation to a pair of driving axles 11. As shown, the motor device or turbine is fixedly secured to the gear casing.

As the width of the locomotive frame necessarily limits the width of the gearing, a limitation is imposed thereby on the load which it is feasible to transmit. In accordance with the present invention, instead of the entire load being borne by the successive meshing gear regions along a single path of power transmission, the gearing is arranged so as to provide a pair of paths of power transmission so that the load may be divided between the meshing gear regions of the paths. Thus, instead of the teeth at each meshing region being stressed to an extent corresponding to the total load, as the load is divided between the branches of the train, the stress at each meshing region corresponds to the part of the total load carried by its branch, with the result that, for gears of a given width, greater power may be transmitted from the turbine to the driving axles.

The gearing, at 10, comprises a toothed high-speed driving pinion 16 connected to the turbine or motor device spindle 17 and meshing with a pair of toothed high-speed gears 18 connected to the toothed low-speed pinions 19, which mesh with toothed low-speed gears 20 connected to the adjacent axles 11 by couplings, at 21, permitting of relative displacement of the latter. The couplings, at 21, include springs 22 for transmitting torque from the low-speed gears 20 to the pair of adjacent driving wheels 11. At each side of the locomotive in Figs. 1 and 3, the drivers are connected by side rods 23 with the result that said pair of driving axles are connected for rotation in unison. As the high-speed gears 18 mesh with circumferentially spaced regions of the high-speed pinion 16, it will be apparent that, instead of the train embracing a single path of power transmission to an axle, it includes a pair of branches to adjacent axles, and that, on that account, if the load is divided, the tooth stresses at the meshing regions will be reduced commensurate with the load transmitted by the respective branches.

Figure 1:
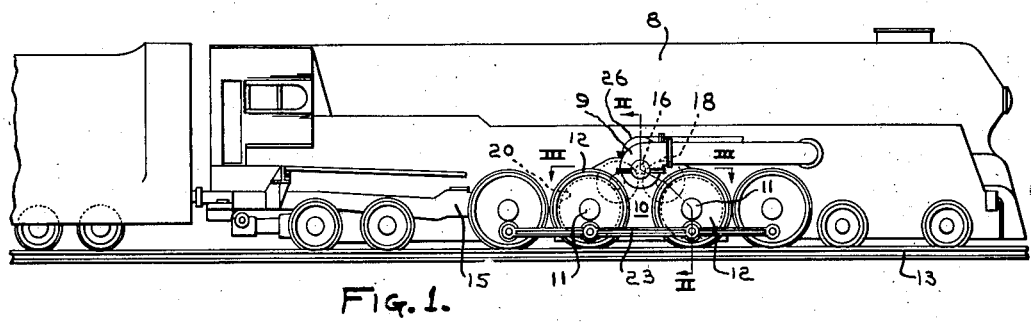
Fig. 1 is a side elevational view of a turbine-driven locomotive showing the improved transmission applied thereto.
Figure 3:
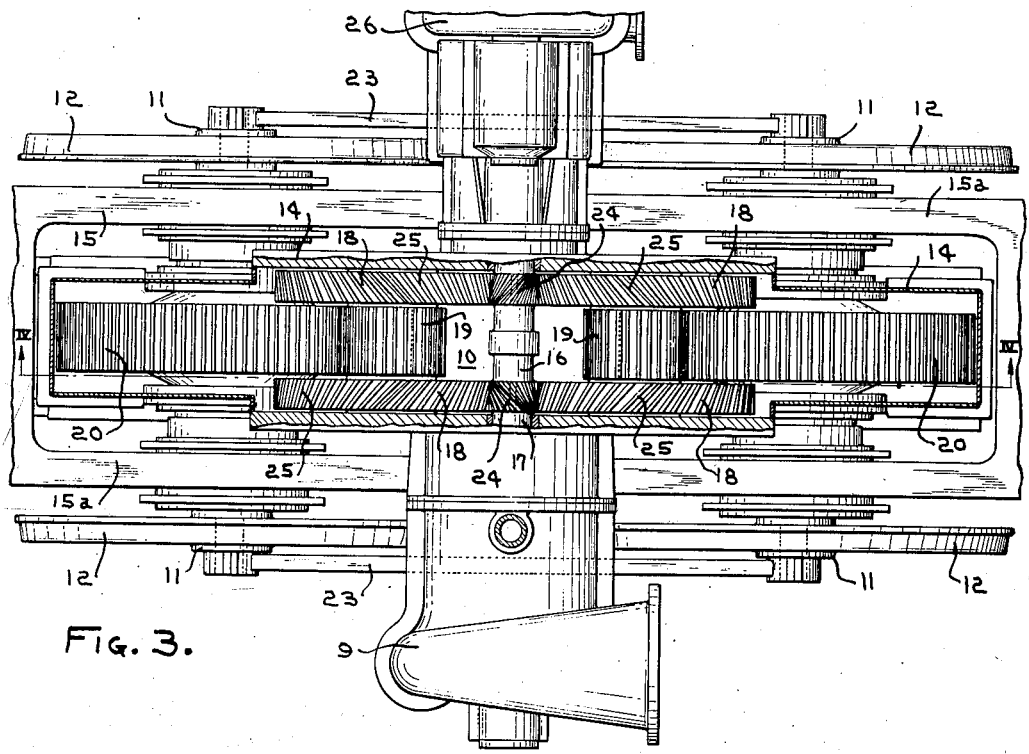
Fig. 3 is a sectional view taken along the line III—III of Fig. 1 and viewed in the direction of the arrows.
Figure 4:
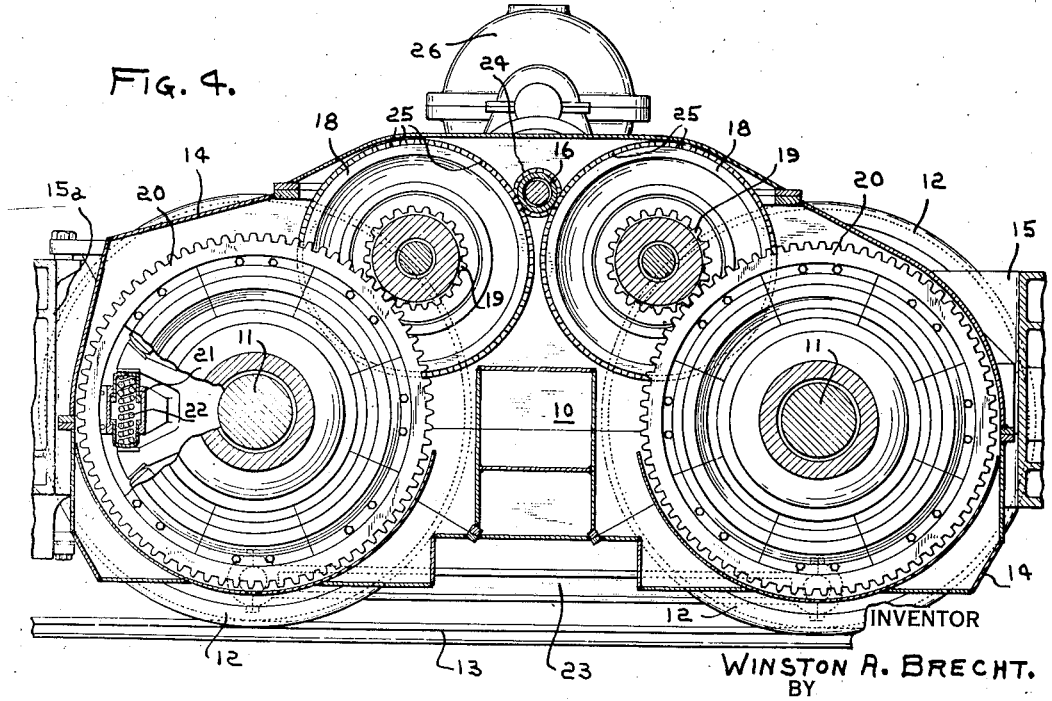
Fig. 4 is a sectional view taken along the line IV—IV of Fig. 3.

As shown in Figs. 1 and 3, the side rods 23 complete the transmission loop, that is, they connect or lock together the two branches of the gear train and it, therefore, becomes possible to divide the load between the branches. While it would be possible to divide the load without the employment of the yieldable connecting means or couplings, at 21, it is more practicable and feasible to utilize the latter in the achievement of this purpose. As the spring couplings equalize and distribute the load under all operating conditions, it will be apparent that the incorporation thereof in the locked branches of the transmission provides for division of the load between the meshing tooth regions of the branches. With the spring couplings, if there is a tendency for an increased load along one branch of the train, the springs of the coupling of that branch will tend to yield, and, in consequence, the load along the other branch will be increased. Thus, relative yielding permitted by the couplings assures of division of the load so that, for a given total load, the tooth stresses may be reduced.

Referring to the gearing, at 10, more in detail, the high-speed driving pinion 16 preferably includes opposed helically-toothed portions 24. Each of the high-speed gears 18 is connected to an associated low-speed pinion so as to constitute a high-speed gear and low-speed pinion aggregate having high-speed, helically-toothed portions 25 which mesh with the pinion portions 24. Each low-speed pinion and low-speed gear is preferably of the spur type.

As turbines are usually unidirectional, some means must be provided for reversing or backing the locomotive. Therefore, in addition to the ahead turbine 9 already described, there is preferably also provided a reversing or backing turbine 26 carried by the locomotive frame and connected in any suitable manner to the high-speed pinion 16.

Figure 5:
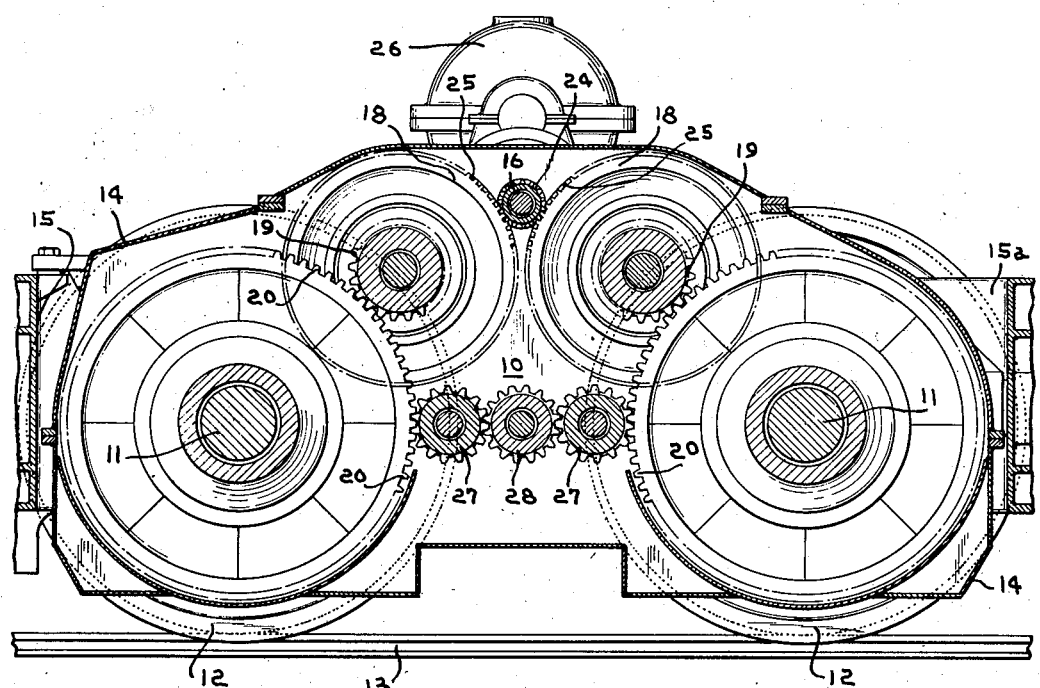
Fig. 5 is a view similar to Fig. 4 but showing an alternative form of the apparatus; and, Fig. 6 is a side elevational view, partly in section, and showing a further modified arrangement.

Instead of using side links 23 for locking the branches of the transmission train, adjacent axles 11 may be connected by idlers 27 meshing with the low-speed gears 20 and with an intermediate idler 28, as shown in Fig. 5.

Figure 6:
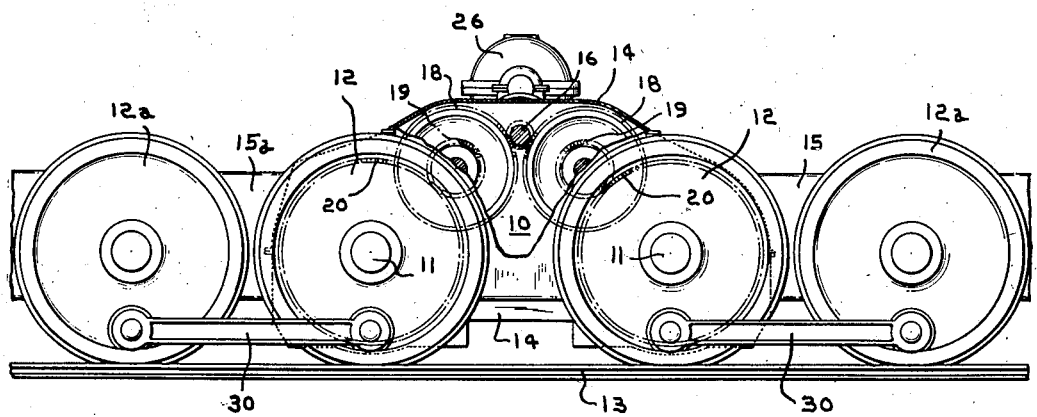

As shown in Fig. 6, the branches of the transmission train may be locked together due to friction of the drivers 12 and 12a engaging the rails 13. This arrangement is substantially the same as that shown in Fig. 1 except that, instead of side links 23 connecting adjacent drivers 12 to which the branches of the transmission train are connected, such side links are omitted and the side links 30 connecting the adjacent drivers 12 to outer drivers 12a serve to provide frictional engagement of the drivers with respect to the rails to maintain division of the load transmitted from the high-speed pinion through the two branches of the transmission to the adjacent drivers 12.

While the invention has been shown in several forms, it will be obvious to those skilled in the art that it is not so limited, but is susceptible of various other changes and modifications without departing from the spirit thereof, and it is desired, therefore, that only such limitations shall be placed thereupon as are specifically set forth in the appended claims.

What is claimed is:

1. In toothed gearing for transmitting power from a motor device to a pair of driving axles of a locomotive, a toothed high-speed pinion driven by the motor device, a pair of toothed high-speed gears meshing with the pinion at circumferentially spaced regions of the latter, a pair of low-speed pinions connected to the high-speed gears for rotation in unison with the latter, a pair of toothed low-speed gears meshing with the low-speed pinions, torque-transmitting spring means for connecting the low-speed gears to the driving axles of said pair, and means including side links for connecting the driving axles of said pair together for rotation in unison.

2. In toothed gearing for transmitting power from a motor device to a pair of driving axles of a locomotive, a toothed high-speed pinion driven by the motor device, a pair of toothed high-speed gears meshing with the pinion at circumferentially spaced regions of the latter, a pair of low-speed pinions connected to the high-speed gears for rotation in unison with the latter, a pair of toothed low-speed gears meshing with the low-speed pinions, torque-transmitting spring means for connecting the low-speed gears to the driving axles of said pair, and means for connecting the driving axles of said pair together for rotation in unison.

3. The combination as claimed in claim 2 wherein the axes of the connected high-speed gears and low-speed pinions are arranged below the axis of the high-speed pinion and the axes of the driving axles are located below said axes of the connected high-speed gears and low-speed pinions.

WINSTON A. BRECHT.